(12) United States Patent
Yamada et al.

(10) Patent No.: US 7,883,807 B2
(45) Date of Patent: Feb. 8, 2011

(54) MEMBRANE/ELECTRODE ASSEMBLY FOR POLYMER ELECTROLYTE FUEL CELLS, AND METHOD FOR OPERATING POLYMER ELECTROLYTE FUEL CELL

(75) Inventors: Kohta Yamada, Tokyo (JP); Shinji Terazono, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 59 days.

(21) Appl. No.: 12/021,842

(22) Filed: Jan. 29, 2008

(65) Prior Publication Data

US 2008/0187792 A1 Aug. 7, 2008

(30) Foreign Application Priority Data

Jan. 30, 2007 (JP) .............................. 2007-019363

(51) Int. Cl.
*H01M 8/10* (2006.01)
(52) U.S. Cl. ...................................... 429/428; 429/492
(58) Field of Classification Search .................. 429/13, 429/33, 428, 492
See application file for complete search history.

(56) References Cited

U.S. PATENT DOCUMENTS

| 6,764,780 B2 * | 7/2004 | Roberts et al. ................. 429/13 |
| 2002/0160272 A1 * | 10/2002 | Tanaka et al. ................. 429/314 |
| 2005/0186460 A1 * | 8/2005 | Kanaoka et al. ............... 429/30 |
| 2008/0038613 A1 * | 2/2008 | Padberg et al. ................ 429/30 |

FOREIGN PATENT DOCUMENTS

| EP | 1 596 453 A1 | 1/2005 |
| EP | 1 914 824 A1 | 4/2008 |
| EP | 1 916 237 A1 | 4/2008 |
| JP | 10-223249 | 8/1998 |
| WO | WO 2007/013532 A1 | 2/2007 |
| WO | WO 2007/013533 A1 | 2/2007 |

OTHER PUBLICATIONS

U.S. Appl. No. 11/771,414, filed Jun. 29, 2007, Shimohira, et al.
U.S. Appl. No. 11/771,332, filed Jun. 29, 2007, Shimohira, et al.
U.S. Appl. No. 12/010,586, filed Jan. 28, 2008, Kaneko, et al.
U.S. Appl. No. 12/010,589, filed Jan. 28, 2008, Kaneko, et al.

* cited by examiner

*Primary Examiner*—Patrick Ryan
*Assistant Examiner*—Brent Thomas
(74) *Attorney, Agent, or Firm*—Oblon, Spivak, McClelland, Maier & Neustadt, L.L.P.

(57) ABSTRACT

To provide a membrane/electrode assembly and a method for operating a polymer electrolyte fuel cell, whereby power generation will not be terminated even when the power generation is initiated in such an environment that the temperature of the membrane/electrode assembly is at most 0° C. A membrane/electrode assembly 10 for polymer electrolyte fuel cells, which comprises an anode 13 and a cathode 14 each having a catalyst layer 11 containing a proton-conductive fluoropolymer (A), and a polymer electrolyte membrane 15 containing a proton-conductive fluoropolymer (B), disposed between the anode 13 and the cathode 14, wherein each of the above proton-conductive fluoropolymer (A) and the above proton-conductive fluoropolymer (B) has an ion exchange capacity of from 1.4 to 1.8 meq/g dry resin, and each of the above proton-conductive fluoropolymer (A) and the above proton-conductive fluoropolymer (B) has a water content of at most 150 mass %.

20 Claims, 1 Drawing Sheet

MEMBRANE/ELECTRODE ASSEMBLY FOR POLYMER ELECTROLYTE FUEL CELLS, AND METHOD FOR OPERATING POLYMER ELECTROLYTE FUEL CELL

The present invention relates to a membrane/electrode assembly for polymer electrolyte fuel cells, and a method for operating a polymer electrolyte fuel cell.

A polymer electrolyte fuel cell is expected to be a power source for electric cars or for domestic use. Such a polymer electrolyte fuel cell is one prepared by sandwiching a membrane/electrode assembly between two separators to form a cell and stacking a plurality of such cells so that separators and membrane/electrode assemblies are alternately overlaid. The membrane/electrode assembly is one comprising an anode and a cathode each having a catalyst layer and a gas diffusion layer, and a polymer electrolyte membrane disposed between the anode and the cathode.

Such a polymer electrolyte fuel cell will have the following problem when power generation is initiated in such an environment that the temperature of the membrane/electrode assembly is at most 0° C.

On the cathode side of the polymer electrolyte fuel cell, water will be generated by a reaction of proton and oxygen. Immediately after the initiation of the power generation, warm air operation of the polymer electrolyte fuel cell is not sufficient, and the generated water will freeze in the catalyst layer or the gas diffusion layer. Therefore, before the temperature of the membrane/electrode assembly becomes higher than 0° C. by warm air operation of the polymer electrolyte fuel cell, gas diffusion failure due to the frozen water occurs in the catalyst layer or the gas diffusion layer, and the power generation comes to a stop.

As a polymer electrolyte fuel cell to solve such a problem, the following one has been proposed.

(1) A polymer electrolyte fuel cell having a means provided to add methanol to a gas flow path on the anode side during the shutdown of the polymer electrolyte fuel cell (Patent Document 1).

However, such a polymer electrolyte fuel cell of (1) has a problem such that the system tends to be cumbersome, since it is necessary to provide a means to add methanol. Further, it has a problem such that the catalyst of the catalyst layer will be poisoned by methanol, thus leading to deterioration of the catalytic performance.

Patent Document 1: JP-A-10-223249

It is an object of the present invention to provide a membrane/electrode assembly whereby it is possible to obtain a polymer electrolyte fuel cell whereby power generation will not stop even when the power generation is initiated in such an environment that the temperature of the membrane/electrode assembly is at most 0° C., without necessity to provide a means to prevent freezing, and a method for operating a polymer electrolyte fuel cell whereby power generation will not stop even when the power generation is initiated in such an environment that the temperature of the membrane/electrode assembly is at most 0° C. without necessity to provide a means to prevent freezing.

The membrane/electrode assembly for a polymer electrolyte fuel cell of the present invention is a membrane/electrode assembly for polymer electrolyte fuel cells, which comprises an anode and a cathode each having a catalyst layer containing a proton-conductive fluoropolymer (A), and a polymer electrolyte membrane containing a proton-conductive fluoropolymer (B), disposed between the anode and the cathode, wherein each of the above proton-conductive fluoropolymer (A) and the above proton-conductive fluoropolymer (B) has an ion exchange capacity of from 1.4 to 1.8 meq/g dry resin, and each of the above proton-conductive fluoropolymer (A) and the above proton-conductive fluoropolymer (B) has a water content of at most 150 mass %.

Each of the above proton-conductive fluoropolymer (A) and the above proton-conductive fluoropolymer (B) is preferably a perfluorocarbon polymer having ionic groups.

The method for operating a polymer electrolyte fuel cell of the present invention is a method for operating a polymer electrolyte fuel cell having a membrane/electrode assembly for polymer electrolyte fuel cells, wherein as the above membrane/electrode assembly for polymer electrolyte fuel cells, the membrane/electrode assembly for polymer electrolyte fuel cells of the present invention is employed, and the power generation is initiated in such an environment that the temperature of the membrane/electrode assembly is at most 0° C.

It is preferred that before stopping the operation of the polymer electrolyte fuel cell, the relative humidity of a gas in the polymer electrolyte fuel cell is maintained to be at most 60%.

The current density at the initiation of the power generation is preferably from 0.01 to 0.5 A/cm$^2$.

According to the membrane/electrode assembly for polymer electrolyte fuel cells of the present invention, it is possible to provide a polymer electrolyte fuel cell whereby power generation will not stop even when the power generation is initiated in such an environment that the temperature of the membrane/electrode assembly is at most 0° C., without necessity to provide a means to prevent freezing.

According to the method for operating a polymer electrolyte fuel cell of the present invention, power generation will not stop even when the power generation is initiated in such an environment that the temperature of the membrane/electrode assembly is at most 0° C., without necessity to provide a means to prevent freezing.

DESCRIPTION OF THE DRAWINGS

In the accompanying drawings.

In the drawings, reference numeral 10 represents a membrane/electrode assembly, 11 a catalyst layer, 13 an anode, 14 a cathode, and 15 a polymer electrolyte membrane.

In this specification, a group represented by the formula (α) will be referred to as a group (α). The same applies to groups represented by other formulae. Further, a compound presented by the formula (1) will be referred to as a compound (1). The same applies to compounds represented by other formulae.

Membrane/Electrode Assembly

Figure 1:
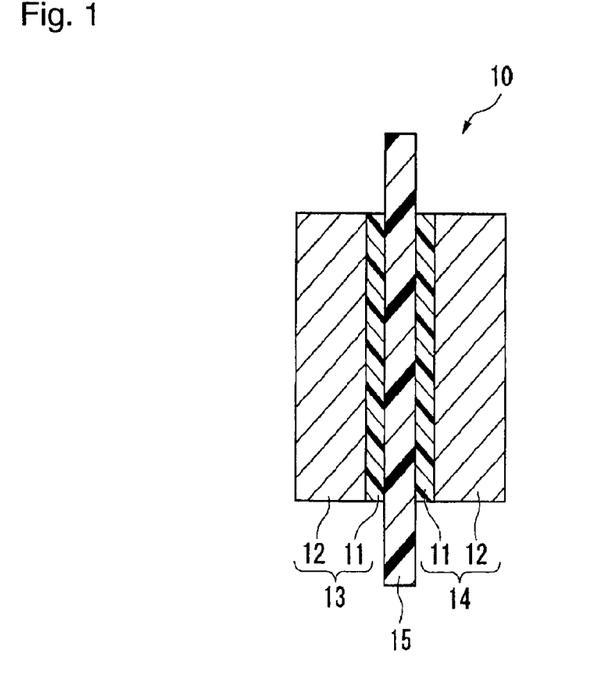
FIG. 1 is a cross-sectional view illustrating one embodiment of the membrane/electrode assembly of the present invention.

FIG. 1 is a cross-sectional view illustrating an embodiment of the membrane/electrode assembly for polymer electrolyte fuel cells of the present invention (hereinafter referred to as the membrane/electrode assembly). The membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

Catalyst Layer

The catalyst layer 11 is a layer containing a catalyst and a proton-conductive fluoropolymer (A).

The catalyst may be a supported catalyst having a noble metal supported on a carbon material as a support. The carbon material may, for example, be carbon black, activated carbon, carbon nanotubes or carbon nanohorns. The noble metal may, for example, be platinum or a platinum alloy.

The catalyst layer may contain a carbon material having no noble metal supported, as the case requires. The catalyst layer 11 of the anode 13 and the catalyst layer 11 of the cathode 14 may be the same or different.

The proton-conductive fluoropolymer (A) has an ion exchange capacity of from 1.4 to 1.8 meq/g dry resin, preferably from 1.5 to 1.7 meq/g dry resin. When the proton-conductive fluoropolymer (A) has an ion exchange capacity of at least 1.4 meq/g dry resin, sufficient heat generation is obtainable by the reaction which takes place in the catalyst layer 11. When the proton-conductive fluoropolymer (A) has an ion exchange capacity of at most 1.8 meq/g dry resin, excessive swelling of the proton-conductive fluoropolymer (A) can be suppressed, whereby deterioration of the output voltage due to e.g. clogging of the catalyst layer or the gas diffusion layer can be suppressed.

The ion exchange capacity of the proton-conductive fluoropolymer (A) is determined by the following method.

The proton-conductive fluoropolymer is immersed and hydrolyzed in a sodium hydroxide solution having a prescribed concentration by using water and methanol as solvents, and the solution is subjected to back titration to obtain the ion exchange capacity.

The proton-conductive fluoropolymer (A) has a water content of at most 150 mass %, preferably at most 140 mass %, more preferably at most 130 mass %. When the proton-conductive fluoropolymer (A) has a water content of at most 150 mass %, excessive swelling of the proton-conductive fluoropolymer (A) will be suppressed, whereby lowering of the output voltage due to e.g. clogging of the catalyst layer or the gas diffusion layer can be suppressed. The proton-conductive fluoropolymer (A) preferably has a water content of at least 65 mass %.

The water content of the proton-conductive fluoropolymer (A) is determined by the following method.

The proton-conductive fluoropolymer is immersed in warm water of 80° C. for 16 hours, then the proton-conductive fluoropolymer is, together with warm water, cooled to room temperature. From the water, the proton-conductive fluoropolymer is taken out, and water droplets deposited on the surface are wiped off, whereupon the mass at the time of absorption of water of the proton-conductive fluoropolymer us immediately measured. Then, the proton-conductive fluoropolymer is put into a glove box and left to stand for at least 24 hours in an atmosphere of a dried nitrogen flow thereby to dry the proton-conductive fluoropolymer. And, in the glove box, the dried mass of the proton-conductive fluoropolymer is measured. The difference between the mass at the time of absorption of water of the proton-conductive fluoropolymer and the dried mass becomes the mass of water absorbed at the time of absorption of the proton-conductive fluoropolymer. And the water content of the proton-conductive fluoropolymer is obtained by the following formula.

Water content=(mass of water absorbed by the proton-conductive fluoropolymer at the time of absorption of water/dried mass of the proton-conductive fluoropolymer)×100

In a case where the proton-conductive fluoropolymer is a liquid composition which will be described hereinafter, the liquid composition is applied on a suitable substrate, dried and heat-treated to form a film, whereupon the water content is determined. The temperature for the heat treatment is preferably from 180 to 200° C. If the temperature for the heat treatment is too low, depending upon the type of the proton-conductive fluoropolymer, the polymer backbone will not be stabilized, and the water content tends to be higher than the true water content. If the temperature for the heat treatment is too high, thermal decomposition of ionic groups starts, whereby the water content tends to be lower than the true water content.

The proton-conductive fluoropolymer (A) may, for example, be a fluoropolymer having ionic groups, and from the viewpoint of chemical durability, a fluoropolymer having ionic groups is preferred. The ionic groups may, for example, be sulfonic acid groups, sulfonimide groups or sulfonmethide groups.

The fluoropolymer having ionic groups is preferably a polymer (hereinafter referred to as polymer Q) having repeating units having a group (α).

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkylene group which may have an etheric oxygen atom, X is an oxygen atom, a nitrogen atom or a carbon atom, "a" is 0 when X is an oxygen atom, 1 when X is a nitrogen atom, or 2 when X is a carbon atom, and Y is a fluorine atom or a monovalent perfluoro organic group.

In a case where the perfluoroalkylene group for $Q^1$ or $Q^2$ in the group (α) has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond. The perfluoroalkylene group may be linear or branched, and is preferably linear.

The number of carbon atoms in the perfluoroalkylene group is preferably from 1 to 6, more preferably from 1 to 4. If the number of carbon atoms is too large, the boiling point of the fluoromonomer tends to be high, and purification by distillation tends to be difficult. Further, if the number of carbon atoms is too large, the ion exchange capacity of the polymer Q tends to be low.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability in power generation performance will be achieved when a polymer electrolyte fuel cell is operated over a long period of time, as compared with a case where $Q^2$ is a single bond.

At least one of $Q^1$ and $Q^2$ is preferably a $C_{1-6}$ perfluoroalkylene group having an etheric oxygen atom. A fluoromonomer having a $C_{1-6}$ perfluoroalkylene group having an etheric oxygen atom can be prepared without fluorination reaction with a fluorine gas, and accordingly, its production is easy with good yield.

The —SO₂X(SO₂R^{f1})_a⁻H⁺ group may be sulfonic acid group (a —SO₃⁻H⁺ group), a sulfonimide group (a —SO₂N(SO₂R^{f1})⁻H⁺ group) or a sulfonmethide group (a —SO₂C(SO₂R^{f1})₂⁻H⁺) group).

The perfluoroalkyl group for R^{f1} may be linear or branched, and is preferably linear. The number of carbon atoms in R^{f1} is preferably from 1 to 6, more preferably from 1 to 4. R^{f1} is preferably a perfluoromethyl group, a perfluoroethyl group or the like.

In the case of a sulfonmethide group, two R^{f1} may be the same groups or different groups.

Y is preferably a fluorine atom, or a C_{1-6} linear perfluoroalkyl group which may have an etheric oxygen atom.

The polymer Q may further have repeating units based on other monomers which will be described hereinafter. Among the repeating units based on other monomers, from the viewpoint of chemical durability, repeating units based on a perfluoromonomer are preferred, and from the viewpoint of chemical durability and mechanical strength, repeating units based on tetrafluoroethylene are more preferred.

The polymer Q is preferably a perfluorocarbon polymer from the viewpoint of chemical durability. Such a perfluorocarbon polymer may have an etheric oxygen atom.

The polymer Q may, for example, be produced via the following steps.

(I) A step of polymerizing a monomer having a group (β) (hereinafter referred to as compound (m1)) and, as the case requires, another monomer, to obtain a precursor polymer having —SO₂F groups (hereinafter referred to as a polymer P).

(β)

(II) A step of bringing the polymer P and a fluorine gas into contact with each other, as the case requires, to fluorinate unstable terminal groups of the polymer P.

(III) A step of converting —SO₂F groups in the polymer P to sulfonic acid groups, sulfonimide groups or sulfonmethide groups, to obtain the polymer Q.

Step (I):

The compound (m1) may, for example, be obtained by a preparation example shown in Example 1 given hereinafter.

Another monomer may, for example, be tetrafluoroethylene, chlorotrifluoroethylene, vinylidene fluoride, hexafluoropropylene, trifluoroethylene, vinyl fluoride, ethylene, CF₂=CFOR^{f2}, CH₂=CHR^{f3} or CH₂=CHCH₂R^{f3}, wherein R^{f2} is a C_{1-12} perfluoroalkyl group which may contain an etheric oxygen atom, and R^{f3} is a C_{1-12} perflurooalkyl group.

As another monomer, preferred is a perfluoromonomer from the viewpoint of chemical durability, and more preferred is tetrafluoroethylene.

The polymerization method may be a known polymerization method such as a bulk polymerization method, a solution polymerization method, a suspension polymerization method or an emulsion polymerization method.

The polymerization is carried out under conditions under which radicals will form. As a method of forming radicals, irradiation with radiation rays such as ultraviolet rays, γ-rays or electron rays, or addition of a radical initiator, may, for example, be mentioned.

The polymerization temperature is usually from 20 to 150° C.

The radical initiator may, for example, be a bis(fluoroacyl) peroxide, a bis(chlorofluoroacyl) peroxide, a dialkyl peroxydicarbonate, a diacyl peroxide, a peroxyester, an azo compound or a persulfate, and with a view to obtaining a precursor polymer P having a small number of unstable terminal groups, preferred is a perfluoro compound such as a bis(fluoroacyl) peroxide.

A solvent to be used for the solution polymerization method may, for example, be a polyfluorotrialkylamine compound, a perfluoroalkane, a hydrofluoroalkane, a chlorofluoroalkane, a fluoroolefin having no double bond at a molecular chain terminal, a polyfluorocycloalkane, a polyfluorocyclic ether compound, a hydrofluoroether, a fluorinated low molecular weight polyether or tert-butanol.

Step (II):

The unstable terminal groups are, for example, groups formed by a chain transfer reaction, or groups based on a radical initiator. Specifically, they are, for example, —COOH groups, —CF=CF₂ groups, —COF groups or —CF₂H groups. By fluorinating such unstable terminal groups, decomposition of the polymer Q will be suppressed.

The fluorine gas may be diluted with an inert gas such as nitrogen, helium or carbon dioxide, or may be used as it is without being diluted.

The temperature at which the polymer P and the fluorine gas are brought into contact with each other is preferably from room temperature to 300° C., more preferably from 50 to 250° C., further preferably from 100 to 220° C., particularly preferably from 150 to 200° C. The contact time of the polymer P and the fluorine gas is preferably from one minute to one week, more preferably from one to 50 hours.

Step (III):

For example, in a case where the —SO₂F groups are converted to sulfonic acid groups, Step (III-1) is carried out, and in a case where the —SO₂F groups are converted to sulfonimide groups, Step (III-2) is carried out.

(III-1) A step of hydrolyzing the —SO₂F groups in the polymer P into a sulfonate, and converting the sulfonate to an acid form to obtain sulfonic acid groups.

(III-2) A step of sulfonimidizing the —SO₂F groups in the polymer P to convert them to sulfonimide groups.

Step (III-1):

The hydrolysis is carried out, for example, by bringing the polymer P and a basic compound in contact with each other in a solvent. The basic compound may, for example, be sodium hydroxide or potassium hydroxide. The solvent may, for example, be water, or a mixed solvent of water and a polar solvent. The polar solvent may, for example, be an alcohol (such as methanol or ethanol) or dimethylsulfoxide. The conversion to an acid form is carried out, for example, by bringing the polymer P having —SO₂F groups hydrolyzed into contact with an aqueous solution of e.g. hydrochloric acid or sulfuric acid.

The hydrolysis and the conversion to an acid form are carried out usually at a temperature of from 0 to 120° C.

Step (III-2):

For the sulfonimidation, a known method may, for example, be mentioned such as the method disclosed in U.S. Pat. No. 5,463,005 or the method disclosed in Inorg. Chem. 32(23), p. 5007 1993).

Gas Diffusion Layer

The gas diffusion layer 12 may, for example, be carbon paper, carbon cloth or carbon felt.

The gas diffusion layer 12 is preferably treated with e.g. polytetrafluoroethylene for hydrophobic treatment.

The gas diffusion layer 12 of the anode 13 and the gas diffusion layer 12 of the cathode 14 may be the same or different.

Polymer Electrolyte Membrane

The polymer electrolyte membrane 15 is a membrane containing a proton-conductive fluoropolymer (B).

The proton-conductive fluoropolymer (B) has an ion exchange capacity of from 1.4 to 1.8 meq/g dry resin, preferably from 1.5 to 1.7 meq/g dry resin. When the proton-conductive fluoropolymer (B) has an ion exchange capacity of at least 1.4 meq/g dry resin, the water content of the polymer electrolyte membrane 15 may be made to be sufficiently large. When the proton-conductive fluoropolymer (B) has an ion exchange capacity of at most 1.8 meq/g dry resin, excessive swelling of the proton-conductive fluoropolymer (B) can be suppressed, whereby deformation of the polymer electrolyte membrane 15 and peeling between the polymer electrolyte membrane 15 and the catalyst layer 11 due to such deformation can be prevented.

The ion exchange capacity of the proton-conductive fluoropolymer (B) is determined by the same method as for the proton-conductive fluoropolymer (A).

The proton-conductive fluoropolymer (B) has a water content of at most 150 mass %, preferably at most 140 mass %, more preferably at most 130 mass %. When the proton-conductive fluoropolymer (B) has a water content of at most 150 mass %, excessive swelling of the proton-conductive fluoropolymer (B) can be suppressed, whereby deformation of the polymer electrolyte membrane 15, and peeling between the polymer electrolyte membrane 15 and the catalyst layer 11 due to such deformation can be prevented. The water content of the proton-conductive fluoropolymer (B) is preferably at least 65 mass %.

The water content of the proton-conductive fluoropolymer (B) is determined by the same method as for the proton-conductive fluoropolymer (A).

The proton-conductive fluoropolymer (B) may, for example, be the same polymer as the proton-conductive fluoropolymer (A).

The polymer electrolyte membrane 15 may contain a reinforcing material. The reinforcing material may, for example, be porous material, fiber, woven fabric or non-woven fabric. The material for the reinforcing material may, for example, be a polytetrafluoroethylene, a tetrafluoroethylene/hexafluoropropylene copolymer, a tetrafluoroethylene/perfluoro(alkyl vinyl ether) copolymer, a polyethylene, a polypropylene or a polyphenylenesulfide.

Carbon Layer

Figure 2:
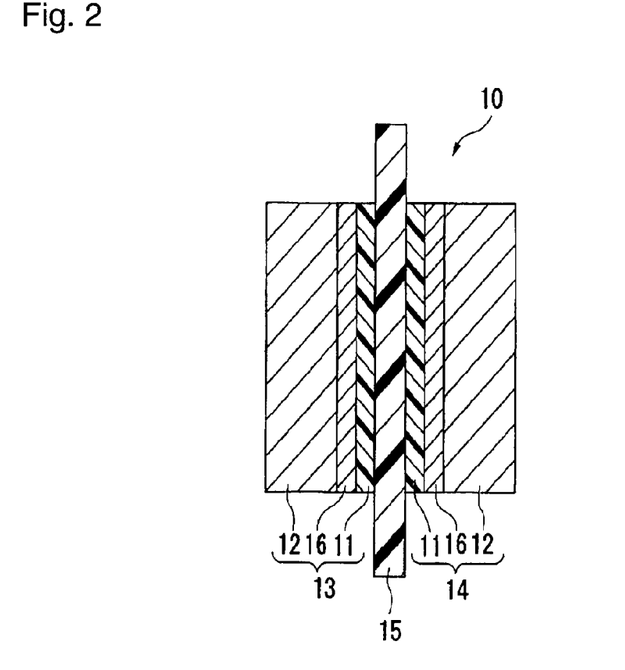
FIG. 2 is a cross-sectional view illustrating another embodiment of the membrane/electrode assembly of the present invention.

The membrane/electrode assembly 10 may have a carbon layer 16 between the catalyst layer 11 and the gas diffusion layer 12, as shown in FIG. 2. By disposing the carbon layer 16, the gas diffusibility on the surface of the catalyst layer 11 will be improved, whereby the output voltage of the polymer electrolyte fuel cell will be substantially improved.

The carbon layer 16 is a layer containing carbon and a fluoropolymer.

The carbon is preferably carbon nanofibers having a fiber diameter of from 1 to 1,000 nm and a fiber length of at most 1,000 µm.

The fluoropolymer may, for example, be polytetrafluoroethylene.

Process for Producing Membrane/Electrode Assembly

Hereinafter, the proton-conductive fluoropolymer (A) and the proton-conductive fluoropolymer (B) will be generally referred to as proton-conductive polymers.

The membrane/electrode assembly 10 is produced, for example, by the following processes.

(a-1) A process of forming catalyst layers 11 on a polymer electrolyte membrane 15 to prepare a membrane/catalyst layer assembly, and sandwiching the membrane/catalyst layer assembly between gas diffusion layers 12.

(a-2) A process of forming a catalyst layer 11 on a gas diffusion layer 12 to prepare electrodes (anode 13, cathode 14) and sandwiching a polymer electrolyte membrane 15 between the electrodes.

In a case where the membrane/electrode assembly 10 has carbon layers 16, the membrane/electrode assembly 10 is produced, for example, by the following processes.

(b-1) A process of applying a dispersion containing carbon and a fluoropolymer to a substrate film and drying the dispersion to form a carbon layer 16, forming a catalyst layer 11 on the carbon layer 16, bonding such catalyst layers 11 and a polymer electrolyte membrane 15, separating the substrate films to prepare a membrane/catalyst layer assembly having carbon layers 16, and sandwiching the membrane/catalyst layer assembly between gas diffusion layers 12.

(b-2) A process of applying a dispersion containing carbon and a fluoropolymer to a gas diffusion layer 12 and drying the dispersion to form a carbon layer 16, and sandwiching a membrane/catalyst layer assembly in the process (a-1) between such gas diffusion layers 12 each having a carbon layer 16.

The polymer electrolyte membrane 15 is produced by the following methods.

(x-1) A method of forming the precursor polymer into a membrane and then, converting —$SO_2F$ groups to ionic groups.

(x-2) A method of forming a proton-conductive polymer into a membrane.

Method (x-1):

As a method of forming the precursor polymer into a membrane, an extrusion method, a press molding method or a stretch molding method may, for example, be mentioned.

Method (x-2):

The method of forming a proton-conductive polymer into a membrane may be a method (a casting method) wherein a liquid composition of a proton-conductive polymer is applied to a substrate, followed by drying.

The liquid composition is a dispersion having a proton-conductive polymer dispersed in a dispersing medium comprising water and an organic solvent having a hydroxyl group.

The organic solvent having a hydroxyl group is preferably an organic solvent having from 1 to 4 carbon atoms in its main chain, and it may, for example, be methanol, ethanol, n-propanol, isopropanol, tert-butanol or n-butanol. Such organic solvents having a hydroxyl group may be used alone or in combination as a mixture of two or more of them.

The proportion of water is preferably from 10 to 99 mass %, more preferably from 40 to 99 mass %, in the dispersing medium (100 mass %). By increasing the proportion of water, the dispersibility of the proton-conductive polymer in the dispersing medium can be improved. The proportion of the organic solvent having a hydroxyl group is preferably from 1 to 90 mass %, more preferably from 1 to 60 mass %, in the dispersing medium (100 mass %).

The proportion of the proton-conductive polymer is preferably from 1 to 50 mass %, more preferably from 3 to 30 mass %, in the liquid composition (100 mass %).

In order to stabilize the polymer electrolyte membrane 15, it is preferred to carry out anneal treatment. The temperature for such anneal treatment is preferably from 130 to 200° C., although it may depend on the type of the proton-conductive polymer. When the temperature for anneal treatment is at least 130° C., the water content of the proton-conductive polymer may be controlled to be low. When the temperature of the anneal treatment is at most 200° C., thermal decomposition of ionic groups can be prevented, whereby deterioration of the proton-conductivity can be prevented.

As a process for forming the catalyst layer 11, the following processes may be mentioned.

(y-1) A process of applying a liquid for forming a catalyst layer to a polymer electrolyte membrane 15, a gas diffusion layer 12 or a carbon layer 16 and drying the liquid.

(y-2) A process of applying a liquid for forming a catalyst layer to a substrate film and drying the liquid to form a catalyst layer 11, and transferring the catalyst layer 11 to a polymer electrolyte membrane 15.

The liquid for forming a catalyst layer is a liquid having a proton-conductive polymer and a catalyst dispersed in a dispersion medium. The liquid for forming a catalyst layer may be prepared, for example, by mixing the above liquid composition with a dispersion of the catalyst.

The viscosity of the liquid for forming a catalyst layer varies depending upon the process for forming a catalyst layer 11, and accordingly, the liquid may be a dispersion having a viscosity of several tens cP or may be a paste having a viscosity of about 20,000 cP.

In order to stabilize the proton-conductive polymer in the catalyst layer 11, it is preferred to carry out anneal treatment. The temperature for such anneal treatment is preferably from 130 to 200° C., although it may depend upon the type of the proton-conductive polymer. When the temperature for anneal treatment is at least 130° C., the water content of the proton-conductive polymer can be controlled to be low, and deterioration in gas diffusibility in the catalyst layer 11 can be prevented, whereby deterioration of the output voltage can be prevented. When the temperature for anneal treatment is at most 200° C., thermal decomposition of ionic groups can be prevented, whereby deterioration of the proton-conductivity can be prevented, and deterioration of the output voltage can be prevented. If the temperature for heat treatment exceeds 190° C., depending upon the type of the catalyst, the carbon support is likely to be oxidized and decomposed. Accordingly, it is preferred to carry out the anneal treatment in a nitrogen atmosphere under reduced pressure or in an environment wherein oxygen in the catalyst layer 11 is reduced by a pressure of e.g. pressing.

In the above-described membrane/electrode assembly 10, the proton-conductive polymer contained in the polymer electrolyte membrane 15 has a high ion exchange capacity of at least 1.4 meq/g dry resin, whereby a sufficient amount of water can be maintained by the membrane/catalyst layer assembly. Accordingly, water generated on the cathode 14 side will be sufficiently absorbed by the membrane/catalyst layer assembly and will not leak out from the catalyst layer 11 for a while after initiation of the power generation. Namely, in a case where power generation of a polymer electrolyte fuel cell is initiated in such an environment that the temperature of the membrane/electrode assembly 10 is at most 0° C., the amount of water to be frozen in the catalyst layer 11 or the gas diffusion layer 12 can sufficiently be suppressed, and the time until the frozen water clogs the catalyst layer 11 or the gas diffusion layer 12 can be sufficiently delayed.

Further, the proton-conductive polymer contained in the catalyst layer 11 has a high ion exchange capacity of at least 1.4 meq/g dry resin, whereby sufficient heat generation can be obtained by a reaction which takes place in the catalyst layer 11.

As a result, it is possible to prevent frozen water from clogging the catalyst layer 11 or the gas diffusion layer 12 before the temperature of the membrane/electrode assembly 10 becomes higher than 0° C. by warm air operation of the polymer electrolyte fuel cell, whereby the power generation will not stop, and after the temperature of the membrane/electrode assembly 10 becomes higher than 0° C. by warm water operation of the polymer electrolyte fuel cell, the power generation can be continuously carried out in a stabilized state.

Method for Operating Polymer Electrolyte Fuel Cell

The method for operating a polymer electrolyte fuel cell of the present invention is a method for operating a polymer electrolyte fuel cell having a membrane/electrode assembly, wherein as the membrane/electrode assembly, a membrane/electrode assembly of the present invention is used, and power generation is initiated in such an environment that the temperature of the membrane/electrode assembly is at most 0° C.

The polymer electrolyte fuel cell is produced, for example, by sandwiching a membrane/electrode assembly between two separators to form a cell, and stacking a plurality of such cells so that the separators and the membrane/electrode assemblies are alternately overlaid.

The separator may, for example, be an electrically conductive carbon plate having grooves formed which will be gas flow paths.

As a type of the polymer electrolyte fuel cell, a hydrogen, oxygen type fuel cell or a direct methanol type fuel cell (DMFC) may, for example, be mentioned.

The temperature of the membrane/electrode assembly at the initiation of the power generation is preferably from −40° C. to 0° C., more preferably from −20° C. to 0° C. When the temperature of the membrane/electrode assembly at the initiation of power generation is at least −40° C., the electrical resistance of the polymer electrolyte membrane will not be too high, whereby a sufficient electric current required for warm air operation of the polymer electrolyte fuel cell can be taken out, and the time until the temperature of the membrane/electrode assembly is made higher than 0° C., can be shortened.

It is preferred to maintain the relative humidity of the gas in the polymer electrolyte fuel cell to be at most 60%, more preferably at most 40%, before stopping the operation of the polymer electrolyte fuel cell. By stopping the operation of the polymer electrolyte fuel cell, while maintaining the relative humidity of the gas in the polymer electrolyte fuel cell to be at most 60%, excess water will be removed from the interior of the polymer electrolyte fuel cell, whereby the water content of the membrane/catalyst layer assembly can be increased. Therefore, when power generation is started again under such an environment that the temperature of the membrane/electrode assembly is at most 0° C., it is possible to further delay the time until frozen water will clog the gas diffusion layer.

As a method for removing water, a method may be mentioned wherein a gas having a relative humidity of at most 60%, such as air or dry nitrogen, is blown into the polymer electrolyte fuel cell. The time for blowing the gas is preferably from 1 to 300 seconds, more preferably from 3 to 180 seconds.

The current density at the initiation of power generation is preferably from 0.01 to 0.5 A/cm$^2$, more preferably from 0.05 to 0.3 A/cm$^2$. When the current density is at least 0.01 A/cm$^2$, it is possible to take out a sufficient electric current required for warm air operation of the polymer electrolyte fuel cell, and it is possible to shorten the time until the temperature of the membrane/electrode assembly becomes higher than 0° C. When the current density is at most 0.5 A/cm², the amount of water generated by power generation can be suppressed, and the time until frozen water clogs the gas diffusion layer, can be delayed.

In the method for operating a polymer electrolyte fuel cell of the present invention as described above, the membrane/electrode assembly of the present invention is used, whereby power generation will not stop even in a case where the power generation is initiated in such an environment that the temperature of the membrane/electrode assembly is from −20 to 0° C. without providing a means to prevent freezing, since the membrane/electrode assembly of the present invention is employed.

EXAMPLES

Now, the present invention will be described in detail with reference to Examples, but it should be understood that the present invention is by no means restricted by such Examples.

Examples 6 to 8 are Working Examples of the present invention, and Examples 9 to 12 are Comparative Examples.

TQ Value

The TQ value (unit: ° C.) is an index for the molecular weight of a polymer and is a temperature at which the amount of a polymer extruded becomes 100 mm³/sec when melt extrusion is carried out under an extrusion pressure of 2.94 MPa by using a nozzle with a length of 1 mm and an inner diameter of 1 mm.

The amount of the polymer P extruded was measured by changing the temperature by using a flow tester CFT-500A (manufactured by Shimadzu Corporation), and the TQ value at which the amount extruded became 100 mm³/sec was determined.

Ion Exchange Capacity

The ion exchange capacity of the polymer P was determined by the following method. The polymer P was hydrolyzed by immersing it in a sodium hydroxide solution having a predetermined concentration using water and methanol as solvents, and the solution was subjected to back titration to obtain the ion exchange capacity. Here, the ratio (molar ratio) of —SO₂F groups in the polymer P is the same as the ratio (molar ratio) of —SO₃H groups in the polymer Q, and the molecular weight of the —SO₂F groups is substantially the same as the molecular weight of the —SO₃H groups. Accordingly, the ion exchange capacity of the polymer P may be regarded as the ion exchange capacity of the polymer Q, as it is.

Electrical Conductivity

The electrical conductivity of the polymer Q was determined by the following method.

To a film of the polymer Q with a width of 5 mm, a substrate having four-terminal electrodes disposed thereon with a distance of 5 mm was closely contacted, and the resistance of the film was measured at an alternating current of 10 kHz at a voltage of 1 V under constant temperature and humidity conditions at a temperature of 80° C. with a relative humidity of 40% by a known four-probe method, and the electrical conductivity was calculated from the results.

Water Content

The water content of the polymer Q was determined by the following method.

The polymer Q was immersed in warm water of 80° C. for 16 hours, and then, the polymer Q was, together with the warm water, cooled to room temperature. From the water, the polymer Q was taken out, and water droplets deposited on the surface were wiped off, whereupon the mass of the polymer Q at the time of absorption of water was immediately measured. Then, the polymer Q was put into a glove box and left to stand for at least 24 hours in an atmosphere of a dry nitrogen stream to dry the polymer Q. And, in the glove box, the dried mass of the polymer Q was measured. From the difference between the mass of the polymer Q at the time of absorption of water and the dried mass, the mass of water absorbed by the polymer Q at the time of absorption of water was determined. And, the water content of the polymer Q was determined by the following formula.

Water content=(mass of water absorbed by the polymer Q at the time of absorption of water/dried mass of the polymer Q)×100

Zero Degree Starting Performance

The membrane/electrode assembly was assembled into a power generation cell; and while the temperature of the membrane/electrode assembly was maintained at 40° C., hydrogen having a relative humidity of 100% was supplied to the anode at a gas flow rate of 200 mL/min under a pressure of 100 kPa (absolute pressure), and air having a relative humidity of 100% was supplied to the cathode at a gas flow rate of 300 mL/min under a pressure of 100 kPa (absolute pressure) to carry out power generation for 12 hours at a current density of 0.7 A/cm², thereby to carry out pretreatment of the membrane/electrode assembly.

Then, while the temperature of the membrane/electrode assembly was maintained at 60° C., nitrogen having a relative humidity of 40% was supplied to the anode and the cathode at a gas flow rate of 200 mL/min for 4 hours to remove excess water in the power generation cell.

The power generation cell was cooled to −20° C. After the cell resistance at −20° C. was stabilized, dried hydrogen was supplied to the anode at a gas flow rate of 100 mL/min, and dried air was supplied to the cathode at a gas flow rate of 150 mL/min to restart the power generation at a current density of 0.05 A/cm².

After the restart of the power generation, water will be generated by a reaction in the power generation cell. If the amount of such water exceeds the water-holding capacity of the membrane/catalyst layer assembly, the water freezes in the catalyst layer or the gas diffusion layer, whereby the cell voltage sharply drops, and the power generation comes to a stop. The time from the restart of the power generation to the stopping of the power generation is regarded as the power generation feasible time, whereby the zero degree starting performance of the membrane/electrode assembly was evaluated.

Example 1

Compound (m11) was prepared by the following synthetic route:

(i) Preparation of Compound (a1):

Compound (a1) was prepared in the same manner as in the method as disclosed in Example 2 of JP-A-57-176973.

(ii) Preparation of Compound (c1):

To a 300 cm³ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b1) was added dropwise from the dropping funnel over a period of 32 minutes at an internal temperature of at most 10° C. After completion of the dropwise addition, 82.0 g of compound (a1) was added dropwise from the dropping funnel over a period of 15 minutes. Substantially no increase in the internal temperature was observed. After completion of the dropwise addition, the internal temperature was recovered to room temperature, followed by stirring for about 90 minutes. The lower layer was recovered by a separatory funnel. The recovered amount was 127.6 g. The recovered liquid was put in a 200 cm³ four-necked round bottom flask, followed by distillation to obtain 97.7 g of compound (c1) as a fraction at a degree of vacuum of from 1.0 to 1.1 kPa (absolute pressure). The gas chromatography (hereinafter referred to as GC) purity was 98%, and the yield was 80%.

(iii) Preparation of Compound (d1):

To a 200 cm³ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of compound (c1) were put in the autoclave under reduced pressure.

Then, the autoclave was cooled in an ice bath, 27.2 g of hexafluoropropene oxide was added over a period of 27 minutes at an internal temperature of from 0 to 5° C., and the internal temperature was recovered to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d1) as a fraction at a boiling point of 80 to 84° C./0.67 to 0.80 kPa (absolute pressure). The GC purity was 98%, and the yield was 56%.

(iv) Preparation of Compound (m11):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 34.6 g of compound (d1) was supplied to the fluidized bed type reactor over a period of 1.5 hours so that the molar ratio of compound (d1)/$N_2$ would be 1/20 while the reaction temperature was maintained at 340° C. After completion of the reaction, 27 g of a liquid was obtained by the liquid nitrogen trap. The GC purity was 84%. The liquid was subjected to distillation to obtain compound (m11) as a fraction at a boiling point of 69° C./0.40 kPa (absolute pressure). The GC purity was 98%.

$^{19}$F-NMR (282.7 MHz, solvent: $CDCl_3$, standard: $CFCl_3$) of compound (m11).

δ(ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Example 2

(i) Preparation of Polymer P1

Into a 100 cm³ stainless steel autoclave, 9.84 g of compound (m11), 3.09 g of compound (1-1) as a solvent, and 1.3 mg of compound (2) as an initiator, were charged and cooled with liquid nitrogen, followed by deaeration.

$$CClF_2CF_2CHClF \quad (1\text{-}1)$$

$$(CH_3)_2C(CN)N = NC(CH_3)_2(CN) \quad (2)$$

The internal temperature was raised to 70° C., tetrafluoroethylene was introduced to the autoclave, and the pressure was adjusted to 1.31 MPaG (gauge pressure). Polymerization was carried out for 5.7 hours while the temperature and the pressure were maintained constant. Then, the autoclave was cooled to terminate the polymerization, the gas in the system was purged.

The reaction liquid was diluted with compound (1-1), and then, compound (1-2) was added to coagulate the polymer, followed by filtration.

$$CH_3CCl_2F \quad (1\text{-}2)$$

The polymer was stirred in compound (1-1), and then, compound (1-2) was added to re-coagulate the polymer, is followed by filtration. The polymer was dried under reduced pressure at 80° C. overnight, to obtain polymer P1 which is a copolymer of tetrafluoroethylene and compound (m11). The yield, the ion exchange capacity and the TQ value of the polymer P1 are shown in Table 1.

(ii) Preparation of Film of Polymer Q1

Polymer P1 was treated by the following method to obtain a film of acid form polymer Q1.

First, polymer P1 was formed into a film with a thickness of 25 μm by press molding at the TQ temperature of polymer P1.

Then, the above film was immersed in an aqueous solution containing 30 mass % of dimethyl sulfoxide and 15 mass % of potassium hydroxide at 80° C. for 16 hours to hydrolyze —$SO_2F$ groups in the film thereby to convert these groups to —$SO_3K$ groups.

Then, the above film was immersed in a 3 mol/L hydrochloric acid aqueous solution at 50° C. for 2 hours. The hydrochloric acid aqueous solution was changed, and the same treatment was further carried out four times. The film was sufficiently washed with deionized water to obtain a film of polymer Q1 having —SO₃K groups in the film converted to sulfonic acid groups.

The electrical conductivity and the water content of the film of polymer Q1 were measured. The results are shown in Table 1.

(iii) Preparation of Liquid Composition S1

To polymer Q1, a solvent mixture of ethanol, water and 1-butanol (ethanol/water/1-butanol=35/50/15 by mass ratio) was added to adjust the solid content concentration to 15 mass %, followed by stirring by using an autoclave at 125° C. for 8 hours. Water was further added to adjust the solid content concentration to 9 mass % to obtain liquid composition S1 having polymer Q1 dispersed in a dispersion medium. The composition of the dispersion medium was ethanol/water/1-butanol=21/70/9 (mass ratio).

Example 3

(i) Preparation of Polymer P2

Polymer P2 which is a copolymer of tetrafluoroethylene and compound (m11) was obtained in the same manner as in Example 2 except that the conditions were changed as identified in Table 1. The yield, the ion exchange capacity and the TQ value of the polymer P2 are shown in Table 1.

(ii) Preparation of Film of Polymer Q2

A film of acid form polymer Q2 was obtained in the same manner as in Example 2 except that polymer P2 was used instead of polymer P1.

The electrical conductivity and the water content of polymer Q2 were measured. The results are shown in Table 1.

(iii) Preparation of Liquid Composition S2

Liquid composition S2 was obtained in the same manner as in Example 2 except that polymer Q2 was used instead of polymer Q1.

TABLE 1

|  | Ex. 2 | Ex. 3 |
| --- | --- | --- |
| Autoclave (cm³) | 30 | 30 |
| Compound (m11) (g) | 9.84 | 11.8 |
| Compound (1-1) (g) | 3.09 | 5.58 |
| Compound (2) (mg) | 1.3 | 1.8 |
| Polymerization temperature (° C.) | 70 | 65 |
| Pressure (MPaG) | 1.31 | 1.11 |
| Polymerization time (hr) | 5.7 | 9.0 |
| Precursor polymer | P1 | P2 |
| Yield (g) | 1.2 | 2.1 |
| Ion exchange capacity (meq/g dry resin) | 1.63 | 1.51 |
| TQ value (° C.) | 225 | 270 |
| Proton-conductive polymer | Q1 | Q2 |
| Electrical conductivity (S/cm) | 0.10 | 0.09 |
| Water content (mass %) | 105 | 72 |

Example 4

(i) Preparation of Polymer F1

Tetrafluoroethylene and compound (3) were copolymerized in accordance with Example 1 of JP-A-60-243292, to obtain polymer F1. The ion exchange capacity and the TQ value of polymer F1 are shown in Table 2.

$$CF_2=CFOCF_2CF(CF_3)OCF_2CF_2SO_2F \qquad (3)$$

(ii) Preparation of Film of Polymer H1

Polymer F1 was treated for acid form in the same manner as polymer P1 in Example 2 to obtain a film of acid form polymer H1. The electrical conductivity and the water content of polymer H1 were measured. The results are shown in Table 2.

(iii) Preparation of Liquid Composition S3

To polymer H1, a solvent mixture of ethanol and water (ethanol/water=60/40 mass ratio) was added, and the solid content concentration was adjusted to 26 mass %, followed by stirring at 100° C. for 8 hours by using an autoclave to obtain liquid composition S3 having polymer H1 dispersed in the dispersing medium.

Example 5

(i) Preparation of Polymer F2

Tetrafluoroethylene and compound (3) were copolymerized in the same manner as in Example 4 to obtain polymer F2. The ion exchange capacity and the TQ value of polymer F2 are shown in Table 2.

(ii) Preparation of Film of Polymer H2

Polymer F2 was treated for acid form in the same manner as polymer P1 in Example 2 to obtain a film of acid form polymer H2. The electrical conductivity and the water content of polymer H2 were measured. The results are shown in Table 2.

(iii) Preparation of Liquid Composition S4

To polymer H2, a solvent mixture of ethanol and water (ethanol/water=60/40 mass ratio) was added to adjust the solid content concentration to 26 mass %, followed by stirring at 100° C. for 8 hours by using an autoclave to obtain liquid composition S4 having polymer H2 dispersed in the dispersing medium.

TABLE 2

|  | Ex. 4 | Ex. 5 |
| --- | --- | --- |
| Precursor polymer | F1 | F2 |
| Ion exchange capacity (meq/g dry resin) | 1.44 | 1.10 |
| TQ value (° C.) | 229 | 230 |
| Proton-conductive polymer | H1 | H2 |
| Electrical conductivity (S/cm) | 0.07 | 0.04 |
| Water content (mass %) | 196 | 66 |

Example 6

Water was added in a proper amount to a supported catalyst having 50 mass % of platinum supported on carbon black powder, followed by irradiation with ultrasonic waves for 10 minutes to obtain a catalyst dispersion. The liquid composition S1 was added to the catalyst dispersion so that the mass ratio of polymer Q1 to the carbon black powder (polymer Q1/carbon black powder) became 0.8, and ethanol was further added to adjust the solid content concentration to 10 mass % thereby to obtain a liquid for forming a catalyst layer. Such a liquid was applied to a sheet of an ethylene/tetrafluoroethylene copolymer (hereinafter referred to as ETFE) and dried to form a catalyst layer having a platinum amount of 0.4 mg/cm². Anneal treatment was carried out in a nitrogen atmosphere at 170 to 190° C. to stabilize the proton-conductive polymer in the catalyst layer.

Using the film of polymer Q1 in Example 2 as a polymer electrolyte membrane, the polymer electrolyte membrane was sandwiched between two catalyst layers and hot-pressed at a pressing temperature of 150° C. for a pressing time of 5 minutes under a pressure of 3 MPa to bond catalyst layers on both sides of the polymer electrolyte membrane, and PTFE films were peeled off from the catalyst layers to obtain a membrane/catalyst layer assembly having an electrode area of 25 cm².

On a gas diffusion layer made of carbon paper, a carbon layer comprising carbon and polytetrafluoroethylene, was formed. The membrane/catalyst layer assembly was sandwiched between such gas diffusion layers so that the carbon layers and the catalyst layers are in contact with each other, to obtain a membrane/electrode assembly. This membrane/electrode assembly was evaluated. The results are shown in Table 3.

Example 7

A membrane/electrode assembly was obtained in the same manner as in Example 6 except that the polymer electrolyte membrane was changed to the film of polymer Q2 in Example 3. This membrane/electrode assembly was evaluated. The results are shown in Table 3.

Example 8

A membrane/electrode assembly was obtained in the same manner as in Example 6 except that polymer Q1 in the catalyst layer was changed to polymer Q2. This membrane/electrode assembly was evaluated. The results are shown in Table 3.

Example 9

A membrane/electrode assembly was obtained in the same manner as in Example 6 except that polymer Q1 in the catalyst layer was changed to polymer H1, and the temperature for anneal treatment was changed to 130° C. This membrane/electrode assembly was evaluated. The results are shown in Table 3.

Example 10

A membrane/electrode assembly was obtained in the same manner as in Example 6 except that polymer Q1 in the catalyst layer was changed to polymer H2, and the temperature for anneal treatment was changed to 130° C. This membrane/electrode assembly was evaluated. The results are shown in Table 3.

Example 11

A membrane/electrode assembly was obtained in the same manner as in Example 6 except that the polymer electrolyte membrane was changed to the film of polymer H2 of Example 5. This membrane/electrode assembly was evaluated. The results are shown in Table 3.

Example 12

A membrane/electrode assembly was obtained in the same manner as in Example 6 except that polymer Q1 in the catalyst layer was changed to polymer H2, the temperature for the anneal treatment was changed to 130° C., and the polymer electrolyte membrane was changed to the film of polymer H2 in Example 5. This membrane/electrode assembly was evaluated. The results are shown in Table 3.

TABLE 3

| | Polymer in catalyst layer | Polymer in polymer electrolyte membrane | Power generation feasible time (sec.) |
|---|---|---|---|
| Example 6 | Q1 | Q1 | 346 |
| Example 7 | Q1 | Q2 | 328 |
| Example 8 | Q2 | Q1 | 342 |
| Example 9 | H1 | Q1 | 248 |
| Example 10 | H2 | Q1 | 270 |
| Example 11 | Q1 | H2 | 244 |
| Example 12 | H2 | H2 | 239 |

From the results in Table 3, it is evident that with the membrane/electrode assemblies in Examples 6 to 8 employing polymers having high ion exchange capacities, the power generation feasible time is prolonged, and zero degree starting performance is good.

In the membrane/electrode assemblies in Examples 11 and 12, polymers having low ion exchange capacities were used as the polymer electrolyte membranes, whereby the power generation feasible time is short as compared with Examples 6 to 8.

In the membrane/electrode assembly in Example 10, a polymer having a low ion exchange capacity was employed, whereby local heat generation by a reaction which takes place in the catalyst layer during the power generation tends to be inadequate, and the power generation feasible time is short as compared with Examples 6 to 8.

In the membrane/electrode assembly in Example 9, the water content in the catalyst layer is very much high as compared with the water content of the polymer in the polymer electrolyte membrane, whereby although the water-holding capacity of the membrane/catalyst layer assembly is high, transfer of water from the catalyst layer to the polymer electrolyte membrane does not proceed quickly. Therefore, water tends to remain in the catalyst layer or in the gas diffusion layer, whereby the power generation feasible time is considered to be short as compared with Examples 6 to 8.

By using the membrane/electrode assembly of the present invention, it is possible to obtain a polymer electrolyte fuel cell excellent in the zero degree starting performance.

The entire disclosure of Japanese Patent Application No. 2007-019363 filed on Jan. 30, 2007 including specification, claims, drawings and summary is incorporated herein by reference in its entirety.

What is claimed is:
1. A method for operating a polymer electrolyte fuel cell having a membrane/electrode assembly for polymer electrolyte fuel cells, comprising operating the polymer electrolyte fuel cell;
   wherein the membrane/electrode assembly for polymer electrolyte fuel cells comprises
   an anode and a cathode, each comprising a catalyst layer comprising a proton-conductive fluoropolymer (A) and a catalyst, and a polymer electrolyte membrane comprising a proton-conductive fluoropolymer (B), disposed between the anode and the cathode;

wherein each of the above proton-conductive fluoropolymer (A) and the above proton-conductive fluoropolymer (B) has an ion exchange capacity of from 1.4 to 1.8 meq/g dry resin, and each of the above proton-conductive fluoropolymer (A) and the above proton-conductive fluoropolymer (B) has a water content of at most 150 mass %;

wherein power generation may be initiated in such an environment that the temperature of the membrane/electrode assembly for polymer electrolyte fuel cells may be below 0° C., and wherein the fluoropolymer (A) comprises repeating units having the group (α):

wherein $Q^1$ is a perfluoroalkylene group which, optionally, may comprise an etheric oxygen atom, $Q^2$ is a single bond or a perfluoroalkylene group which, optionally, may comprise an etheric oxygen atom, $R^{f1}$ is a perfluoroalkylene group which, optionally, may comprise an etheric oxygen atom, X is an oxygen atom, a nitrogen atom or a carbon atom, "a" is 0 when X is an oxygen atom, 1 when X is a nitrogen atom, or 2 when X is a carbon atom, and Y is a fluorine atom or a monovalent perfluoro organic group.

2. The method of claim 1, wherein each of the fluoropolymer (A) and the fluoropolymer (B) is a perfluorocarbon polymer comprising ionic groups.

3. The method of claim 1, wherein the operating comprises initiating operating, operating, and terminating operating, and wherein before the terminating operating, a relative humidity of a gas in the polymer electrolyte fuel cell is maintained to be at most 60%.

4. The method of claim 1, wherein the operating comprises initiating operating, and wherein a current density at the initiating operating is from 0.01 to 0.5 A/cm$^2$.

5. The method of claim 4, wherein the current density at initiating operating is from 0.05 to 0.3 A/cm$^2$.

6. The method of claim 1, wherein the fluoropolymer (A) and the fluoropolymer (B) each have an ion exchange capacity of from 1.5 to 1.7 meq/g dry resin.

7. The method of claim 1, wherein the fluoropolymer (A) and the fluoropolymer (B) each have a water content of from 65 to 130 mass %.

8. The method of claim 2, wherein the operating comprises initiating operating, operating, and terminating operating, and wherein before the terminating operating, a relative humidity of a gas in the polymer electrolyte fuel cell is maintained to be at most 60%.

9. The method of claim 2, wherein the operating comprises initiating operating, and wherein a current density at the initiating operating is from 0.01 to 0.5 A/cm$^2$.

10. The method of claim 9, wherein the current density at the initiating operating is from 0.05 to 0.3 A/cm$^2$.

11. The method of claim 8, wherein the current density at the initiating operating is from 0.01 to 0.5 A/cm$^2$.

12. The method of claim 11, wherein the current density at the initiating is from 0.05 to 0.3 A/cm$^2$.

13. The method of claim 1, wherein in the repeating units having the group (α):

$Q^1$ is a perfluoroalkylene group which comprises an etheric oxygen atom, and $Q^2$ is a single bond or a perfluoroalkylene group which comprises an etheric oxygen atom.

14. The method of claim 1, wherein $Q^2$ is a $C_1$-$C_6$ perfluoroalkylene group which, optionally, comprises an etheric oxygen.

15. The method of claim 1, wherein $Q^2$ is a $C_1$-$C_6$ perfluoroalkylene group that comprises the etheric oxygen.

16. The method of claim 1, wherein $Q^2$ is a single bond.

17. The method of claim 1, wherein $R^{f1}$ is a perfluoroalkyl group having 1 to 6 carbon atoms which comprises an etheric oxygen.

18. The method of claim 1, wherein the operating comprises initiating operating, and wherein at the initiating operating, the temperature of the membrane/electrode assembly ranges from below 0° C. to −40° C.

19. The method of claim 1, wherein the catalyst in the catalyst layer of the anode and the cathode is different.

20. The method of claim 1, wherein the —SO$_2$X(SO$_2$R$^{f1}$)$_a$$^-$H$^+$ group is a sulfonmethide group, and wherein the two R$^{f1}$ groups may be the same or different.

* * * * *